US011868091B2

(12) United States Patent
Hiraya

(10) Patent No.: US 11,868,091 B2
(45) Date of Patent: Jan. 9, 2024

(54) WATCH

(71) Applicant: Seiko Epson Corporation, Toyko (JP)

(72) Inventor: Eiichi Hiraya, Shiojiri (JP)

(73) Assignee: SEIKO EPSON CORPORATION

( * ) Notice: Subject to any disclaimer, the term of this patent is extended or adjusted under 35 U.S.C. 154(b) by 523 days.

(21) Appl. No.: 17/158,087

(22) Filed: Jan. 26, 2021

(65) Prior Publication Data

US 2021/0232099 A1 Jul. 29, 2021

(30) Foreign Application Priority Data

Jan. 27, 2020 (JP) ................................. 2020-010599

(51) Int. Cl.

| | |
|---|---|
| ***G04C 10/04*** | (2006.01) |
| ***G04B 1/16*** | (2006.01) |
| ***G04B 11/04*** | (2006.01) |
| ***G04B 19/02*** | (2006.01) |

(52) U.S. Cl.

CPC ............... *G04C 10/04* (2013.01); *G04B 1/16* (2013.01); *G04B 11/04* (2013.01); *G04B 19/02* (2013.01)

(58) Field of Classification Search

CPC .......... G04C 10/04; G04B 1/16; G04B 11/04; G04B 19/02

See application file for complete search history.

(56) References Cited

U.S. PATENT DOCUMENTS 663,263 A * 12/1900 Elenius .................... G04B 9/00 368/210
5,828,628 A * 10/1998 Born ...................... G04B 9/005 368/203
6,685,352 B1 * 2/2004 Capt .................... G04B 13/008 368/210
7,170,825 B2 * 1/2007 Takahashi ................ G04B 9/02 185/44
8,356,930 B2 * 1/2013 Capt ...................... G04B 9/005 368/212
8,801,269 B2 * 8/2014 Grossenbacher .... G04B 19/225 368/208
D854,959 S * 7/2019 Favre ........................... D10/126
11,526,130 B2 * 12/2022 Rombach ................. G04B 9/00

(Continued)

FOREIGN PATENT DOCUMENTS

JP 2017-026460 A 2/2017

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

A watch includes a power reserve hand configured to be visually recognizable from a watch rear side, an oscillating weight including a weight, a transmission wheel configured to rotate a ratchet wheel, a pawl lever configured to engage with the transmission wheel, an eccentric wheel including an eccentric shaft member to which the pawl lever is attached and an eccentric toothed gear, a train wheel bridge provided between the pawl lever and the oscillating weight, and a seconds wheel and pinion including a seconds hand shaft. The eccentric shaft member and the seconds hand shaft are supported by the train wheel bridge. The power reserve hand is disposed in a position that does not overlap the weight in plan view, and is disposed in a position that overlaps the train wheel bridge in side view orthogonal to the seconds hand shaft.

7 Claims, 9 Drawing Sheets

(56) References Cited

U.S. PATENT DOCUMENTS

| | | | | |
|---|---|---|---|---|
| 2007/0195650 | A1* | 8/2007 | Kamiya | G07C 3/045<br>368/223 |
| 2009/0129211 | A1* | 5/2009 | Rochat | G04B 45/0046<br>368/208 |
| 2011/0205857 | A1* | 8/2011 | Beccia | G04B 5/16<br>368/208 |

* cited by examiner

WATCH

The present application is based on, and claims priority from JP Application Serial Number 2020-010599, filed Jan. 27, 2020, the disclosure of which is hereby incorporated by reference herein in its entirety.

BACKGROUND

1. Technical Field

The present disclosure relates to a watch.

2. Related Art

JP-A-2017-26460 discloses a watch including a remaining amount display hand that displays a remaining amount of winding up of a mainspring. In the watch in JP-A-2017-26460, the remaining amount display hand is disposed between a dial and a cover glass similarly to an hour hand, a minute hand, and a seconds hand. Thus, a user of the watch can confirm a remaining amount of the mainspring wound up by confirming an indicated position of the remaining amount display hand from a front side of the watch through the cover glass.

As in the watch in JP-A-2017-26460, a remaining amount display hand is generally a type that is visually recognizable from a front side of a watch. On the other hand, a watch in which a remaining amount display hand is disposed between a movement and a case back has also been developed in a case back skeleton-type watch that allows the movement to be visually recognizable from a case back side by using a glass for the case back of the watch. A user of the watch can confirm a remaining amount of winding up of a mainspring by viewing an indicated position of the remaining amount display hand from a rear side of the watch through the glass of the case back.

In a watch including an automatic winding mechanism, an oscillating weight that generates power for automatic winding up may be provided on a case back side of a movement. In such a watch, when a remaining amount display hand is disposed between the movement and the case back, interference between the oscillating weight and the remaining amount display hand needs to be avoided. At this time, when a weight of the oscillating weight particularly having a great thickness and the remaining amount display hand are disposed so as to overlap each other in a thickness direction of the watch with an intention of avoiding interference between the oscillating weight and the remaining amount display hand, a thickness of the watch increases. Thus, a watch that can reduce a thickness is desired.

SUMMARY

A watch according to the present disclosure includes a barrel complete including a barrel arbor and a mainspring, a ratchet wheel configured to rotate integrally with the barrel arbor, and wind up the mainspring, a power reserve hand configured to be visually recognizable from a watch rear side, and indicate a remaining amount of the mainspring wound up, an oscillating weight including a weight and a weight body configured to support the weight, a transmission wheel configured to rotate the ratchet wheel, a pawl lever configured to engage with the transmission wheel, an eccentric wheel that includes an eccentric shaft member to which the pawl lever is attached and an eccentric toothed gear configured to rotate in conjunction with the oscillating weight, and is configured to cause the pawl lever to advance and retreat in directions toward and away from the transmission wheel, a train wheel bridge provided between the pawl lever and the oscillating weight, and configured to support the transmission wheel, and a seconds wheel and pinion including a seconds hand shaft to which a seconds hand is attached, where the eccentric shaft member and the seconds hand shaft are disposed in positions that do not overlap each other in plan view as viewed from a direction along the seconds hand shaft, and are supported by the train wheel bridge, and the power reserve hand is disposed in a position that does not overlap the weight in the plan view, and is disposed in a position that overlaps the train wheel bridge in side view orthogonal to the seconds hand shaft.

DESCRIPTION OF EXEMPLARY EMBODIMENTS

Exemplary Embodiments

A watch 1 in one exemplary embodiment according to the present disclosure will be described below with reference to the drawings. Note that, in the description of the present exemplary embodiment, a plan view refers to a state viewed from a direction along a seconds hand shaft 941 described later, and a side view refers to a state viewed from a direction perpendicular to the seconds hand shaft 941.

Figure 1:
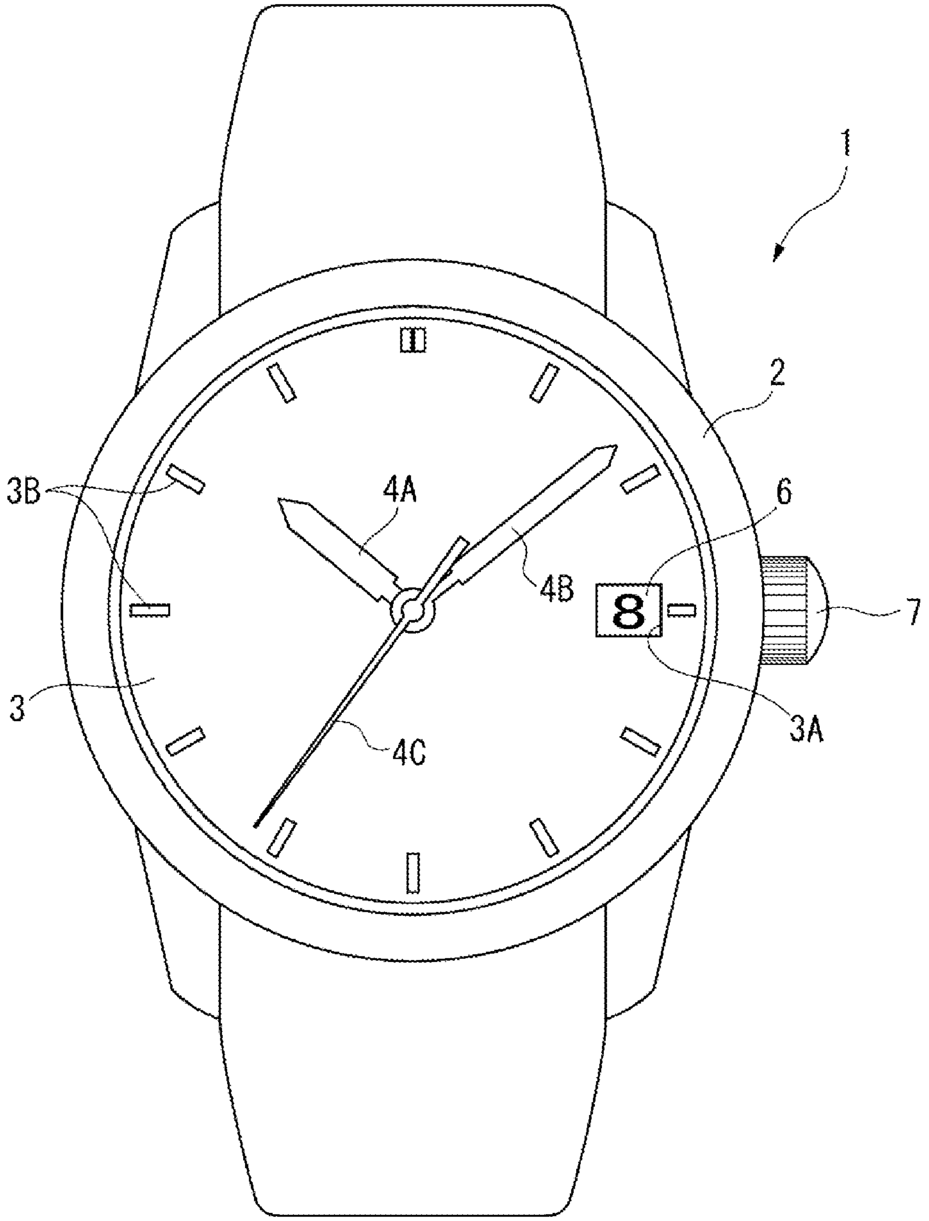
FIG. 1 is a front view illustrating a watch according to one exemplary embodiment.
Figure 2:
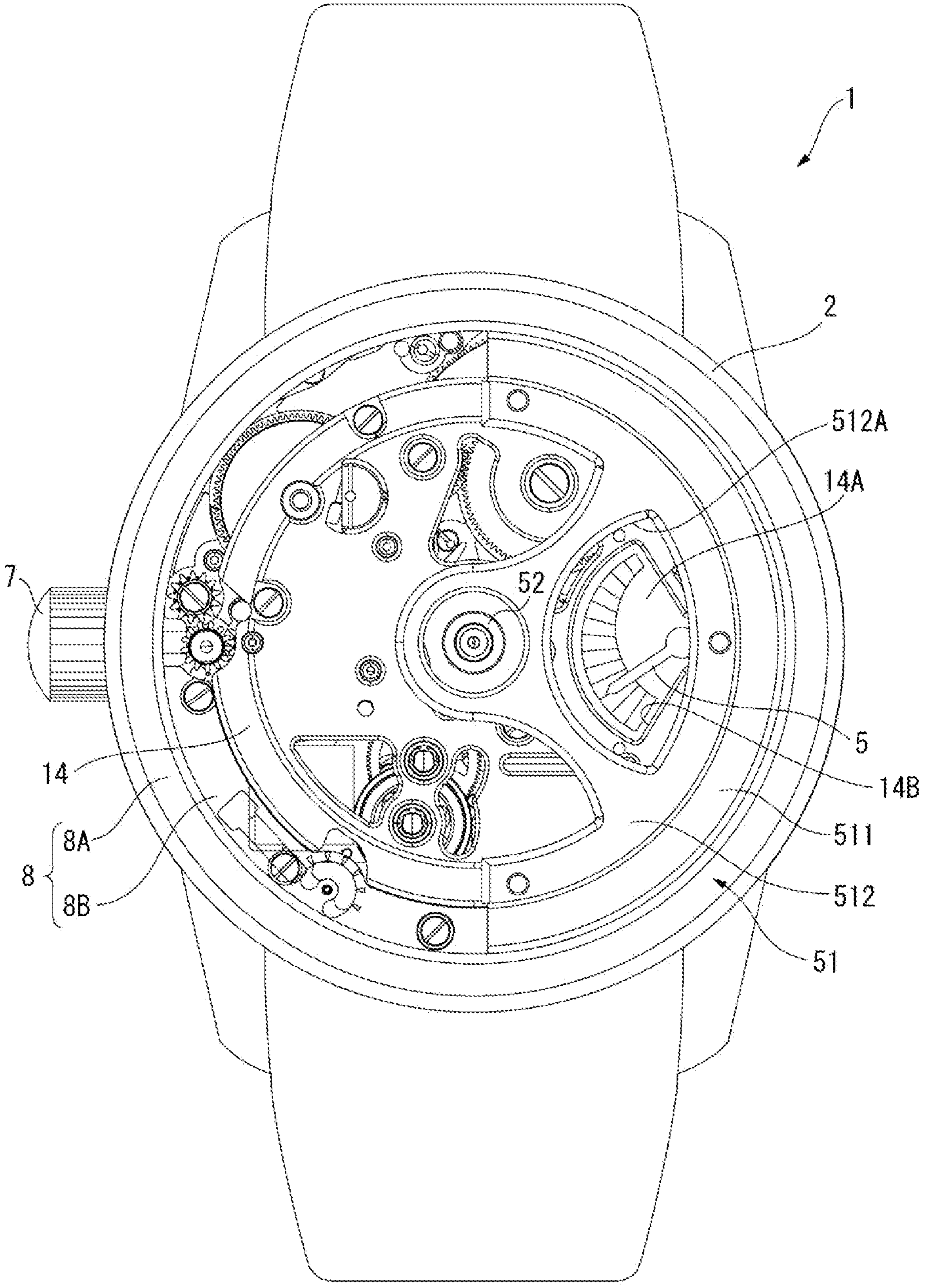
FIG. 2 is a rear view illustrating the watch.

FIG. 1 is a front view illustrating the watch 1, and FIG. 2 is a rear view illustrating the watch 1. The watch 1 according to the present exemplary embodiment is a skeleton-type watch that allows a power reserve hand 5 to be visually recognizable from a rear side of the watch 1.

The watch 1 is a wristwatch mounted on a wrist of a user, and includes an outer case 2 having a cylindrical shape with the dial 3 disposed on an inner circumferential side of the outer case 2. Of two openings of the outer case 2, the opening on the front side is blocked by a cover glass, and the opening on the rear side is blocked by a case back 8. The case back 8 is formed of a frame 8A having a ring shape and a case back glass 8B attached to the frame 8A.

The watch 1 includes a movement 10 illustrated in FIGS. 3 to 9 accommodated in the outer case 2, an hour hand 4A, a minute hand 4B, and a seconds hand 4C that indicate time information illustrated in FIG. 1, and the power reserve hand 5 indicating a remaining amount of winding up of mainsprings illustrated in FIG. 2. The dial 3 is provided with a calendar small window 3A, and a date indicator 6 is visually recognizable from the calendar small window 3A. Further, the dial 3 is provided with an hour mark 3B for indicating time. Note that the hour mark 3B is one example of a graduation according to the present disclosure.

An opening 512A is formed in a weight body 512 of an oscillating weight 51 illustrated in FIG. 2, and is configured such that the power reserve hand 5 is less visually unrecognizable due to a position of the oscillating weight 51.

A scale portion 14A having a fan shape is provided on a rear surface of a train wheel bridge 14 described later. The power reserve hand 5 indicates the scale portion 14A, and thus a remaining amount of the mainspring wound ups can be displayed.

A crown 7 is provided on a side surface of the outer case 2. The crown 7 can be pulled and moved from a zero stage position in which the crown 7 is pushed toward the center of the watch 1 to a one stage position and a two stage position.

When the crown 7 is rotated in the zero stage position, a first mainspring 20 and a second mainspring 30 that are provided in the movement 10 can be wound up, as described later. The power reserve hand 5 moves in conjunction with the winding up of the first mainspring 20 and the second mainspring 30. The watch 1 according to the present exemplary embodiment can secure a duration of approximately 120 hours when the first mainspring 20 and the second mainspring 30 are fully wound up.

When the crown 7 is pulled to the one stage position and is rotated, a date can be adjusted by moving the date indicator 6. When the crown 7 is pulled to the two stage position, the minute hand 4C stops. When the crown 7 is rotated in the two stage position, time can be adjusted by moving the hour hand 4A and the minute hand 4B. A method for correcting the date indicator 6, the hour hand 4A, and the minute hand 4B by the crown 7 is similar to that of a known mechanical watch, and thus description thereof will be omitted.

Movement

Figure 3:
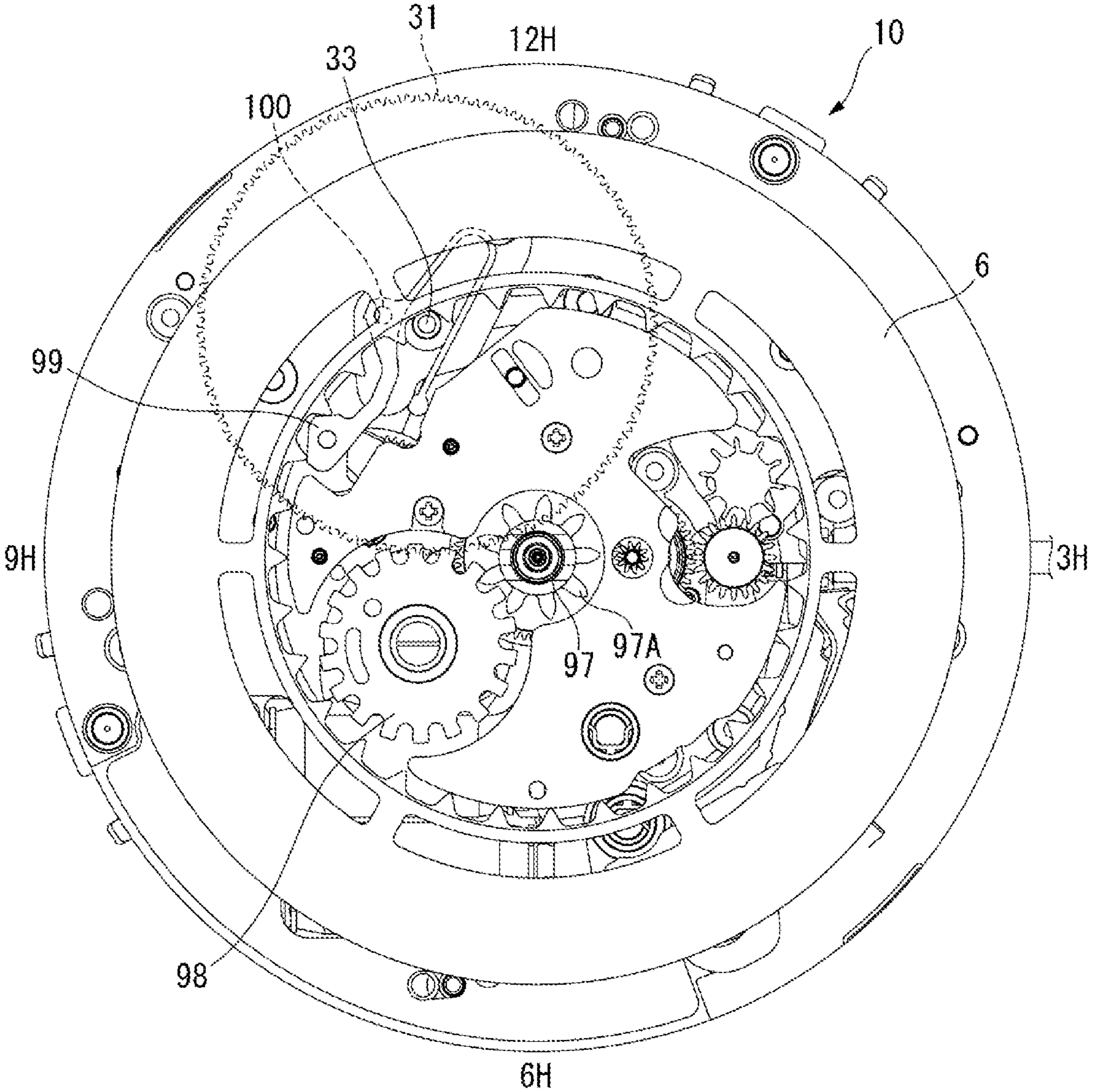
FIG. 3 is a plan view illustrating a main portion of a movement of the watch.
Figure 4:
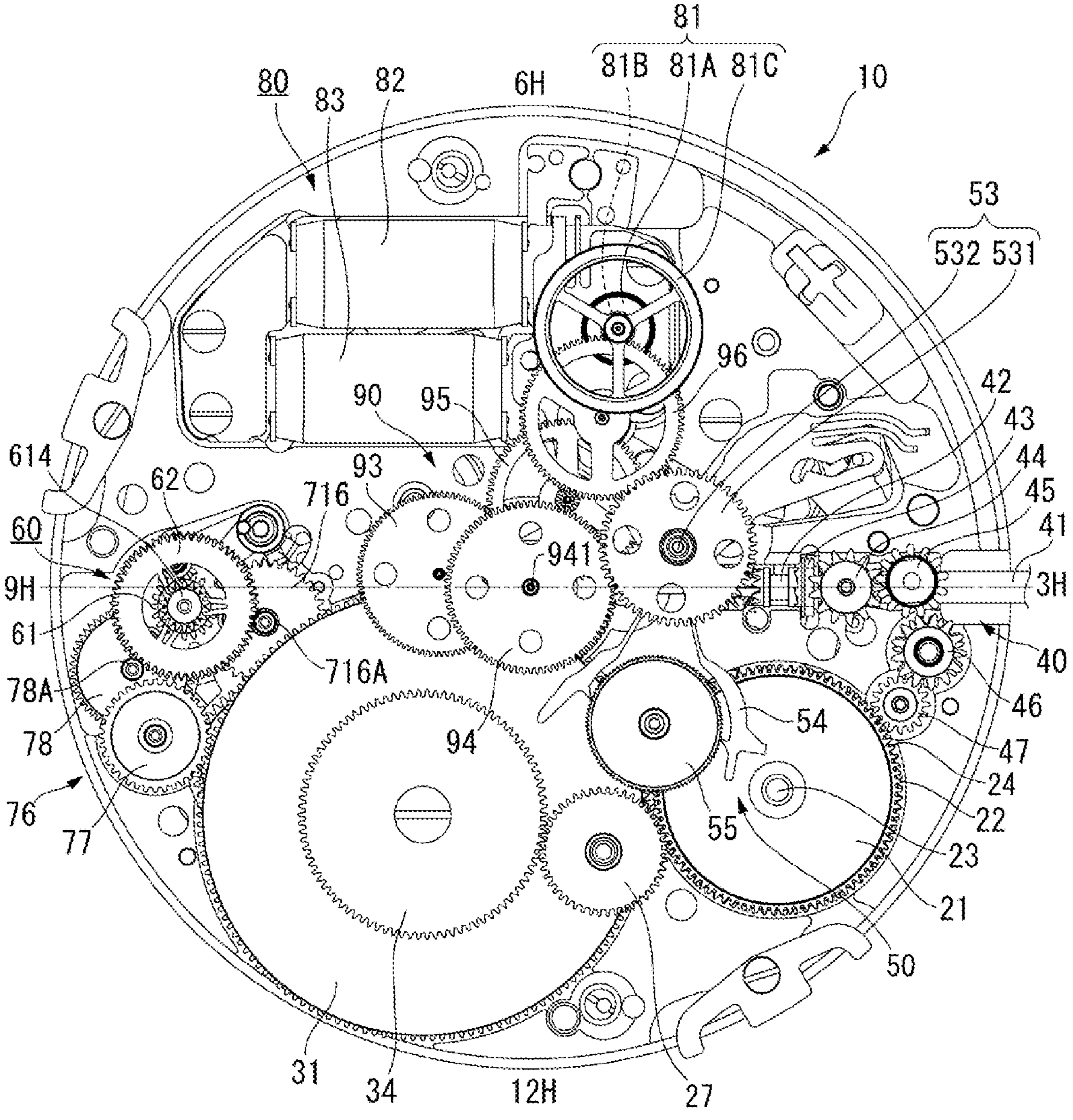
FIG. 4 is a plan view illustrating the main portion of the movement of the watch.
Figure 5:
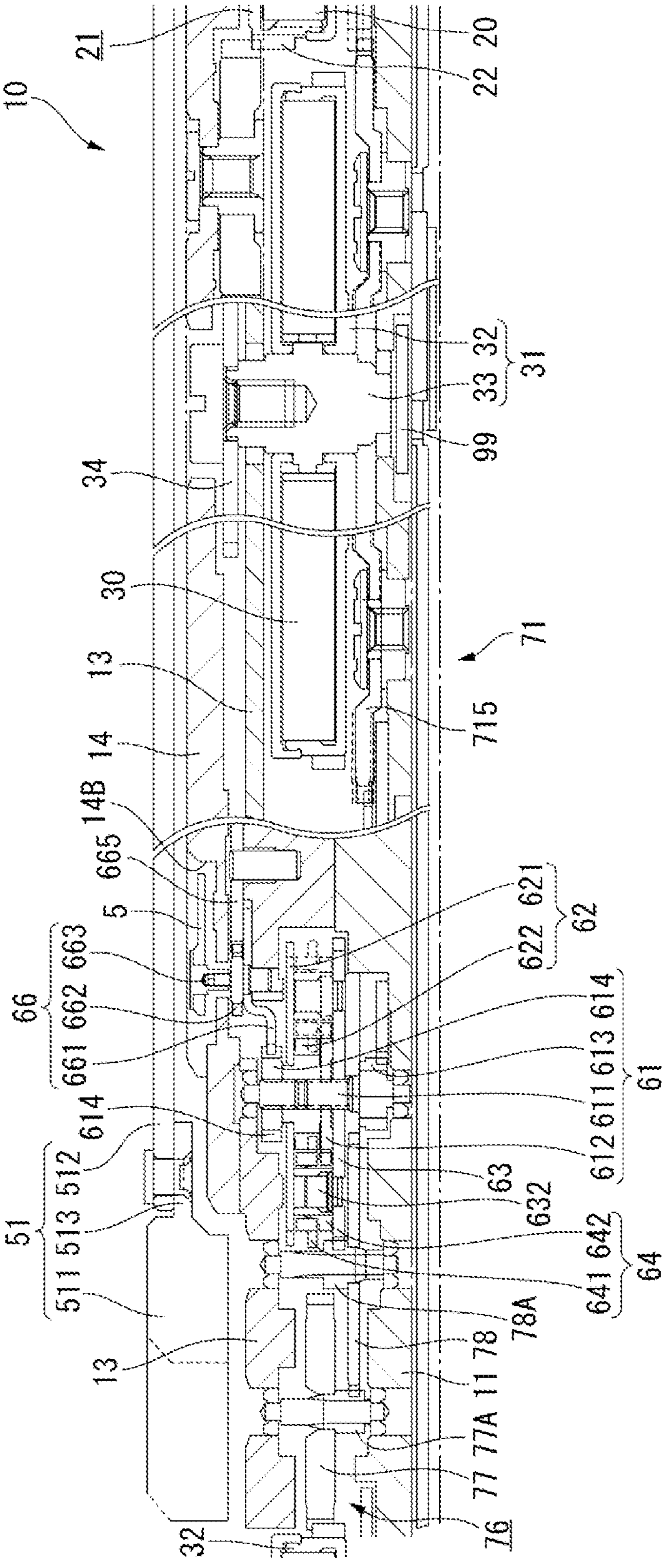
FIG. 5 is a cross-sectional view illustrating the main portion of the movement of the watch.
Figure 6:
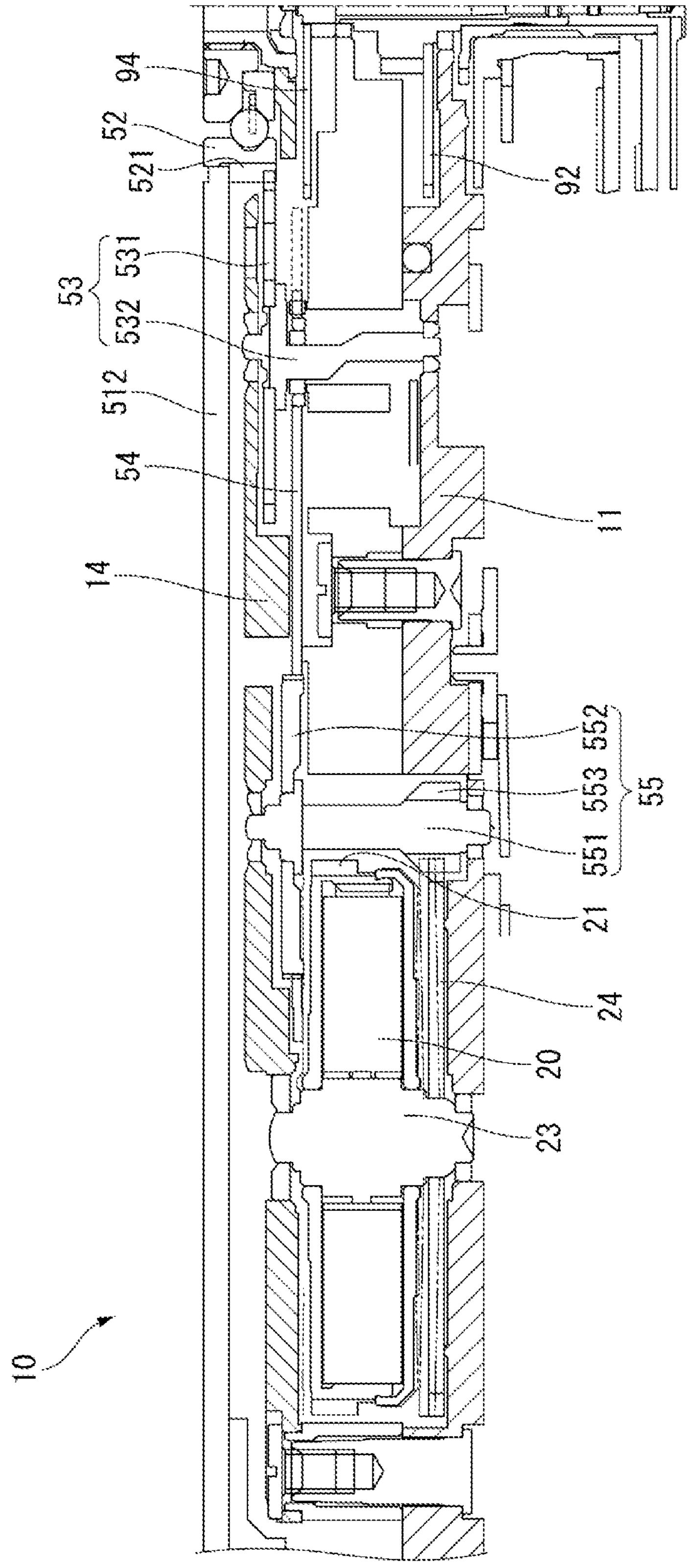
FIG. 6 is a cross-sectional view illustrating the main portion of the movement of the watch.
Figure 7:
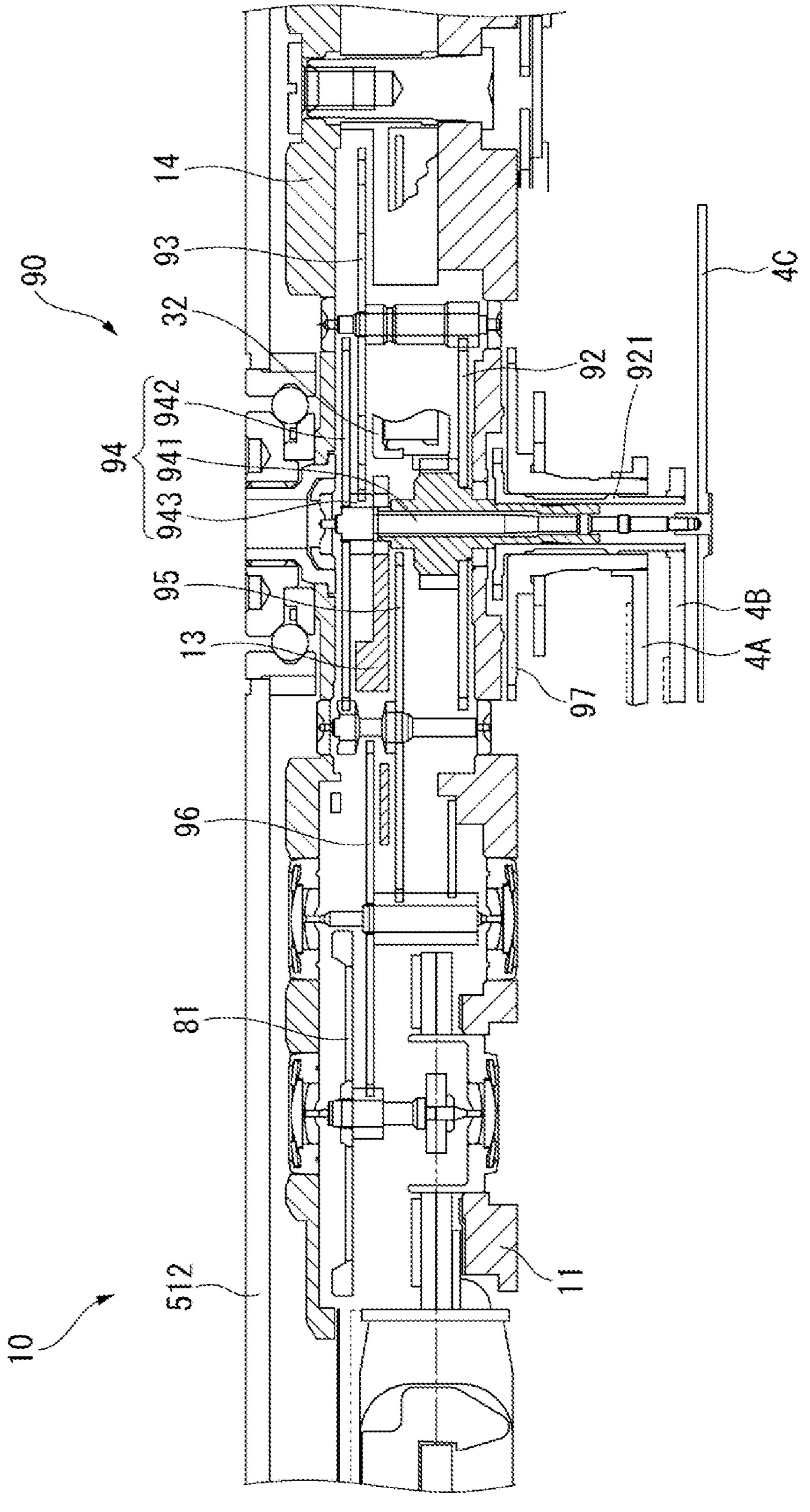
FIG. 7 is a cross-sectional view illustrating the main portion of the movement of the watch.
Figure 8:
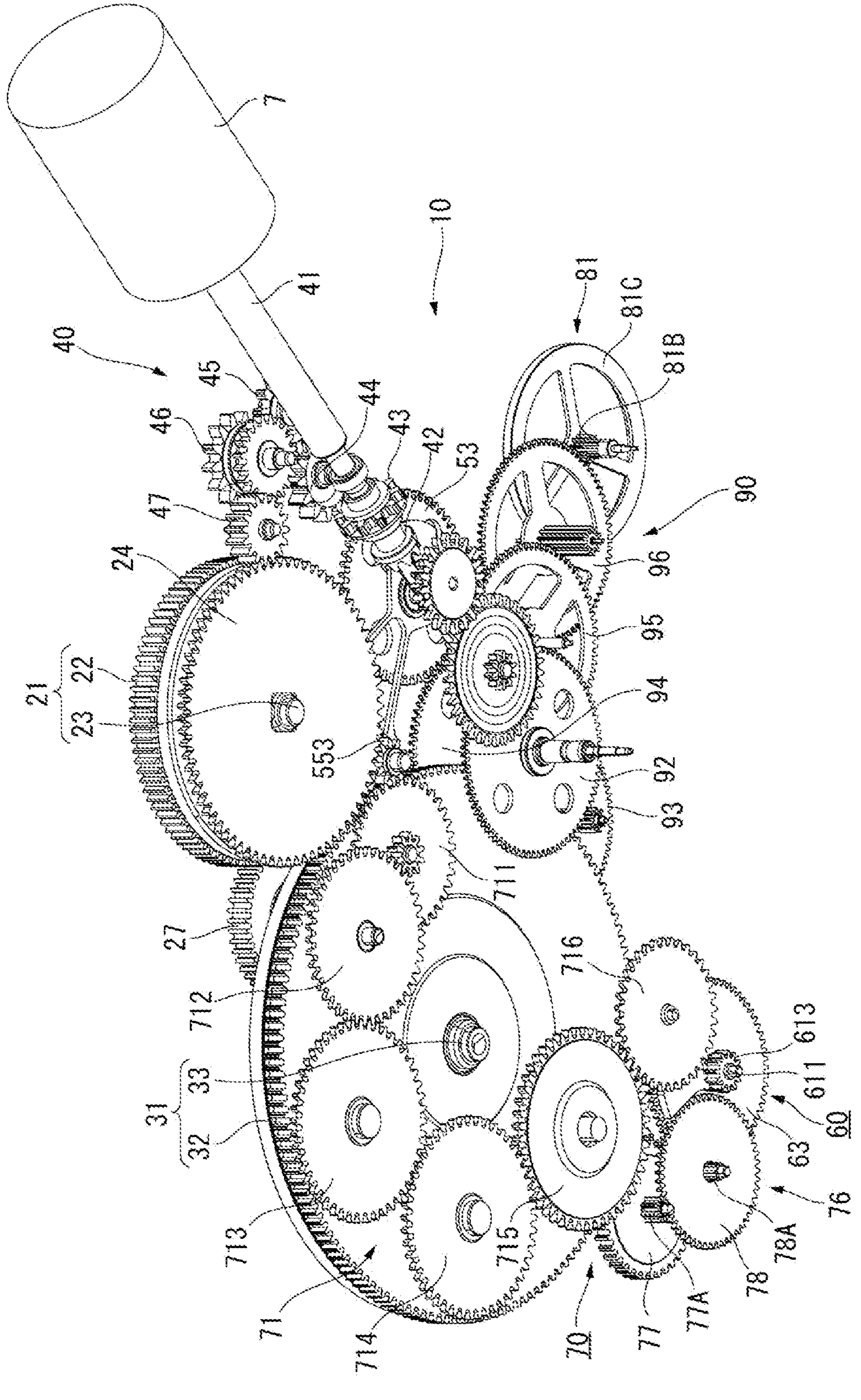
FIG. 8 is a perspective view illustrating the main portion of the movement of the watch.
Figure 9:
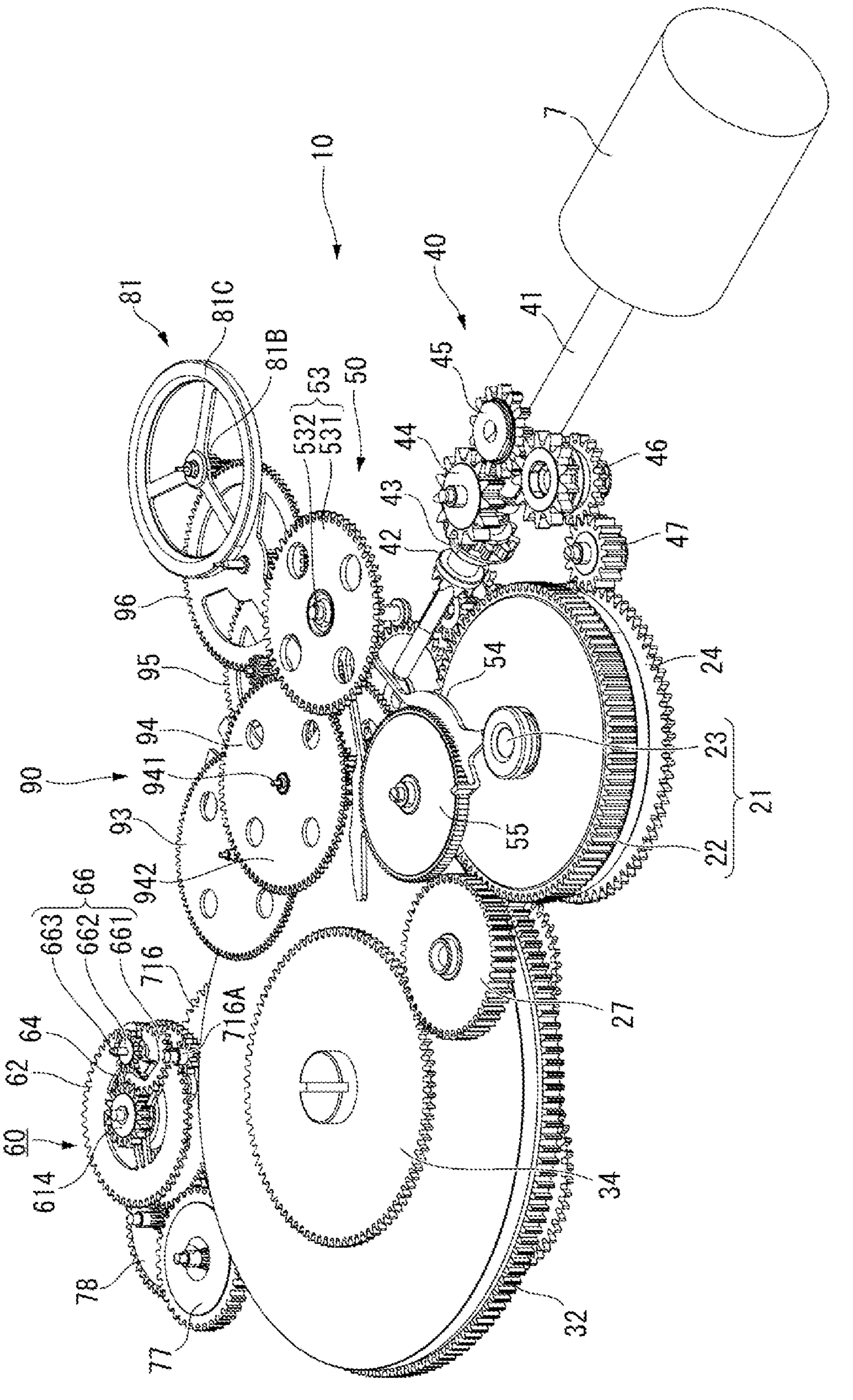
FIG. 9 is a perspective view illustrating the main portion of the movement of the watch.

Next, the movement 10 will be described with reference to FIGS. 3 to 9. FIG. 3 is a plan view of a main portion of the movement 10 as viewed from a dial 3 side. FIG. 4 is a plan view of the main portion of the movement 10 as viewed from a case back 8 side. FIGS. 5 to 7 are cross-sectional views of the main portion of the movement 10. FIGS. 8 and 9 are perspective views illustrating the main portion of the movement 10.

The movement 10 includes the first barrel complete 21 in which the first mainspring 20 is accommodated, and the second barrel complete 31 in which the second mainspring 30 is accommodated. As described later, the hour hand 4A, the minute hand 4B, and the seconds hand 4C are attached to an hour wheel 97, a cannon pinion 921, and a seconds hand axis 941 of the movement 10, respectively, and are driven by the first mainspring 20 and the second mainspring 30 of the movement 10.

Note that the first barrel complete 21 and the second barrel complete 31 constitute a barrel complete according to the present disclosure. Further, the first mainspring 20 and the second mainspring 30 constitute a mainspring according to the present disclosure.

As illustrated in FIGS. 5 to 7, the movement 10 includes a main plate 11, a center wheel bridge 13, and the train wheel bridge 14. As illustrated in FIG. 4, the first barrel complete 21 in which the first mainspring 20 is accommodated, the second barrel complete 31 in which the second mainspring 30 is accommodated, and a manual windup mechanism 40 and an automatic windup mechanism 50 for winding up the first mainspring 20 and the second mainspring 30 are disposed between the main plate 11 and the train wheel bridge 14. Further, a power reserve display mechanism for displaying a remaining amount of winding up of the first mainspring 20 and the second mainspring 30, a display train wheel 90 that transmits torque of the first mainspring 20 and the second mainspring 30, and a generator 80 driven by the torque transmitted via the display train wheel 90 are disposed between the main plate 11, and the central wheel bridge 13 and the train wheel bridge 14.

Here, in the present exemplary embodiment, as illustrated in FIGS. 2 and 5, a weight 511 and the train wheel bridge 14 are disposed in positions that do not overlap each other in the plan view, and are disposed so as to partially overlap each other in the side view. Thus, a thickness of the watch 1 can be reduced as compared to a case in which the weight 511 and the train wheel bridge 14 are disposed side by side in a thickness direction of the watch 1.

First Mainspring and First Barrel Complete

The first mainspring 20 is accommodated in the first barrel complete 21. The first barrel complete 21 includes a first barrel 22 and a first barrel arbor 23. Also, as illustrated in FIG. 8, a first ratchet wheel 24 that rotates integrally with the first barrel arbor 23 is attached to the first barrel arbor 23.

Note that the first barrel arbor 23 constitutes a barrel arbor according to the present disclosure, and the first ratchet wheel 24 constitutes a ratchet wheel according to the present disclosure.

Manual Windup Mechanism

As illustrated in FIGS. 4 and 8, the manual windup mechanism 40 includes a winding stem 41 to which the crown 7 is attached, a clutch wheel 42, a winding pinion 43, a crown wheel 44, a ratchet first transmission wheel 45, a ratchet second transmission wheel 46, and a ratchet third transmission wheel 47. The ratchet third transmission wheel 47 meshes with the first ratchet wheel 24.

Thus, when the user performs a rotation operation on the crown 7 in the zero stage position, the winding stem 41 and the clutch wheel 42 rotate. When the crown 7 is in the zero stage position, the clutch wheel 42 meshes with the winding pinion 43, and the rotation of the clutch wheel 42 is sequentially transmitted from the winding pinion 43 to the crown wheel 44, the ratchet first transmission wheel 45, the ratchet second transmission wheel 46, and the ratchet third transmission wheel 47. Thus, the first ratchet wheel 24 and the first barrel arbor 23 rotate, and the first mainspring 20 is wound up.

Automatic Windup Mechanism

The automatic windup mechanism 50 includes the oscillating weight 51 illustrated in FIGS. 2 and 5, a bearing 52 illustrated in FIGS. 2 and 6, an eccentric wheel 53 illustrated in FIGS. 4 and 6 that meshes with an oscillating weight toothed gear 521 on an outer ring of the bearing 52, a pawl lever 54, and a transmission wheel 55.

The oscillating weight 51 includes a weight 511, a weight body 512 that supports the weight 511, and a coupling portion 513 that couples the weight 511 and the weight body 512.

The bearing 52 rotatably supports the oscillating weight 51, and includes, on the outer ring, the oscillating weight toothed gear 521 that rotates integrally with the oscillating weight 51.

As illustrated in FIG. 6, the eccentric wheel 53 includes an eccentric shaft member 532 and an eccentric toothed gear 531. The eccentric shaft member 532 is supported by the main plate 11 and the train wheel bridge 14. Further, the eccentric shaft member 532 includes an eccentric shaft portion provided eccentrically from a rotary shaft.

The eccentric toothed gear 531 meshes with the oscillating weight toothed gear 521 of the bearing 52. In this way, the eccentric wheel 53 rotates in both positive and reverse directions in conjunction with the oscillating weight 51.

The pawl lever 54 is rotatably attached to the eccentric shaft portion of the eccentric shaft member 532 of the eccentric wheel 53.

When the eccentric wheel 53 rotates in conjunction with the oscillating weight 51, the pawl lever 54 attached to the eccentric wheel 53 advances and retracts in directions toward and away from the transmission wheel 55, and rotates the transmission wheel 55 in one direction.

As illustrated in FIG. 6, the transmission wheel 55 includes a transmission wheel shaft 551, a first transmission toothed gear 552, and a second transmission toothed gear 553.

The transmission wheel shaft 551 is supported by the main plate 11 and the train wheel bridge 14. The pawl lever 54 engages with the first transmission toothed gear 552, and the transmission wheel 55 rotates in one direction in conjunction with the advancing and retracting motion of the pawl lever 54. Then, the second transmission toothed gear 553 meshes with the first ratchet wheel 24. In this way, the first ratchet wheel 24 rotates in conjunction with the rotation of the transmission wheel 55. When the first ratchet wheel 24 rotates, the first barrel arbor 23 rotates integrally with the first ratchet wheel 24, and the first mainspring 20 is wound up.

Therefore, the watch 1 according to the present exemplary embodiment can wind up the first mainspring 20 by both of manual winding up by operating the crown 7 and automatic winding up by rotating the oscillating weight 51.

Second Mainspring and Second Barrel Complete

As illustrated in FIGS. 4 and 5, the second mainspring 30 is accommodated in the second barrel complete 31. The second barrel complete 31 includes a second barrel 32 and the second barrel arbor 33. The second barrel arbor 33 is rotatable integrally with a second ratchet wheel 34.

The second mainspring 30 is wound up by the first mainspring 20. In other words, when the first mainspring 20 is wound up and the torque that can wind up the second mainspring 30 is accumulated, the first barrel 22 of the first barrel complete 21 rotates. The first barrel 22 meshes with the second ratchet wheel 34 of the second barrel complete 31 via a barrel intermediate wheel 27. When the first barrel 22 rotates, the second ratchet wheel 34 and the second barrel arbor 33 rotate, and the second mainspring 30 is wound up.

Therefore, in the watch 1 according to the present exemplary embodiment, the first mainspring 20 and the second mainspring 30 can be wound up by any of the manual windup mechanism 40 and the automatic windup mechanism 50. Note that only one of the manual windup mechanism 40 and the automatic windup mechanism 50 may be provided for the watch 1.

Further, the first barrel complete 21 and the second barrel complete 31 are disposed in one of two regions acquired by virtually dividing the main plate 11 into two in a shaft direction of the winding stem 41. The shaft direction of the winding stem 41 is a direction that connects the hour marks 3B at three o'clock and nine o'clock of the dial 3, and the main plate 11 is virtually divided into two regions on the 12 o'clock side and the six o'clock side. Note that, in the present exemplary embodiment, description is given on the assumption that, of the two regions, the region on the six o'clock side is a first region, and the region on the 12 o'clock side is a second region.

Here, as illustrated in FIG. 4, in the watch 1 according to the present exemplary embodiment, the first barrel complete 21 and the second barrel complete 31 are disposed in positions that do not overlap each other in the plan view in the region on the 12 o'clock side, i.e., the second region. Note that a configuration is not limited to the configuration described above, and, for example, the first barrel complete 21 and the second barrel complete 31 may be disposed in the first region.

Power Reserve Display Mechanism

The watch 1 includes the power reserve display mechanism for displaying a remaining amount of winding up of the first mainspring 20 and the second mainspring 30 that are a drive source. The power reserve display mechanism includes a planetary toothed gear mechanism 60, a power reserve train wheel 70, the fan-shaped scale portion 14A disposed on the train wheel bridge 14 illustrated in FIG. 2, and the power reserve hand 5. A substantially belt-shaped scale indicated by the power reserve hand 5 is written on the scale portion 14A. Note that a duration of the watch 1 can be estimated from a remaining amount of winding up of the first mainspring 20 and the second mainspring 30 that are a drive source, and thus the duration can be indicated by the power reserve hand 5 when a number indicating the duration is printed on the scale portion 14A.

As illustrated in FIG. 8, the power reserve train wheel 70 includes a windup display train wheel 71 and a rewind display train wheel 76.

The windup display train wheel 71 includes a first planetary transmission wheel 711, a second planetary transmission wheel 712, a third planetary transmission wheel 713, a fourth planetary transmission wheel 714, a fifth planetary transmission wheel 715, and a sixth planetary transmission wheel 716. The first planetary transmission wheel 711 meshes with the second transmission toothed gear 553. When the first ratchet wheel 24 is rotated by the manual windup mechanism 40 or the automatic windup mechanism 50, the first ratchet wheel 24, the second transmission toothed gear 553, the first planetary transmission wheel 711, the second planetary transmission wheel 712, the third planetary transmission wheel 713, the fourth planetary transmission wheel 714, the fifth planetary transmission wheel 715, and the sixth planetary transmission wheel 716 rotate in conjunction. As illustrated in FIG. 4, a pinion 716A that meshes with the planetary toothed gear mechanism 60 is provided on a rotary shaft of the sixth planetary transmission wheel 716.

The first planetary transmission wheel 711, the second planetary transmission wheel 712, the third planetary transmission wheel 713, the fourth planetary transmission wheel 714, and the fifth planetary transmission wheel 715 are disposed in positions that overlap the second barrel complete 31 in the plan view. Further, the first planetary transmission wheel 711 to the fifth planetary transmission wheel 715 are disposed along a circumference of the second barrel arbor 33 of the second barrel complete 31, and are disposed in positions that do not overlap the second barrel arbor 33 in the plan view.

As illustrated in FIGS. 4 and 8, the rewind display train wheel 76 includes a seventh planetary transmission wheel 77 and an eighth planetary transmission wheel 78. The seventh planetary transmission wheel 77 includes a pinion 77A that meshes with the eighth planetary transmission wheel 78, and the eighth planetary transmission wheel 78 includes a pinion 78A that meshes with the planetary toothed gear mechanism 60. The seventh planetary transmission wheel 77 meshes with the second barrel 32. When the second barrel 32 rotates, the seventh planetary transmission wheel 77 and the eighth planetary transmission wheel 78 rotate in conjunction.

The seventh planetary transmission wheel 77 and the eighth planetary transmission wheel 78 are rotatably supported by the main plate 11 and the center wheel bridge 13.

As illustrated in FIGS. 4, 5, and 8, the planetary toothed gear mechanism 60 includes a first solar wheel 61, a second solar wheel 62, a planetary intermediate wheel 63, and a planetary wheel 64 rotatably supported by the planetary intermediate wheel 63. As illustrated in FIG. 5, the first solar wheel 61 includes a display arbor 611 rotatably supported by the main plate 11 and the like, and a first solar toothed gear 612 fixed to the display arbor 611. A first pinion 613 is integrally formed on a first end portion of the display arbor 611 on the dial 3 side. A second pinion 614 is attached to a second end portion of the display arbor 611 on the case back side. The first pinion 613 and the second pinion 614 rotate integrally with the display arbor 611 and the first solar toothed gear 612.

As illustrated in FIG. 5, a winding wheel 66 includes a first toothed gear 661, a second toothed gear 662, and a shaft 663. The first toothed gear 661 is a toothed gear that is formed in a substantially semi-circular planar shape and meshes with the second pinion 614. The second toothed gear 662 is a toothed gear that meshes with a toothed gear 665 supported by the center wheel bridge 13. The toothed gear 665 is provided for filling gear-to-gear backlash of the winding wheel 66 and the second pinion 614. A side surface of the toothed gear 665 is biased with a spring (not illustrated) that provides force in an unwinding direction of the second mainspring 30, and the winding wheel 66 is returned in the unwinding direction of the second mainspring 30 via the toothed gear 665. With this configuration, an instruction variation of the power reserve hand 5 can be reduced and suppressed. Note that a configuration without providing the spring for filling the backlash described above may be adopted. Note that the toothed gear 665 is not illustrated in FIG. 4.

Here, in the present exemplary embodiment, as illustrated in FIG. 5, a part of the center wheel bridge 13 that supports the winding wheel 66 is disposed between the weight 511 and the main plate 11. In other words, the center wheel bridge 13 is disposed such that a part thereof overlaps the weight 511 in the plan view. In this way, the seventh planetary transmission wheel 77, the eighth planetary transmission wheel 78, and the like of the rewind display train wheel 76 can be disposed in the space of the weight 511 on the main plate 11 side, and supported by the main plate 11 and the central wheel bridge 13. Thus, in the present exemplary embodiment, the space inside the outer case 2 can be effectively utilized and the watch 1 can be reduced in size as compared to a case in which the weight 511 and the central wheel bridge 13 are disposed so as not to overlap each other in the plan view.

The power reserve hand 5 is attached to the shaft 663 of the winding wheel 66. Therefore, the winding wheel 66 is driven by the second pinion 614, and the power reserve hand 5 is configured to rotate in conjunction with the rotation of the first solar wheel 61.

Here, in the present exemplary embodiment, as illustrated in FIGS. 2 and 5, the power reserve hand 5 is disposed in a recessed portion 14B formed in the train wheel bridge 14, is disposed in a position that does not overlap the weight 511 in the plan view, and is disposed in a position that overlaps the train wheel bridge 14 in the side view. In this way, even when the weight 511 and the power reserve hand 5 are not disposed side by side in the thickness direction of the watch 1, interference between the weight 511 and the power reserve hand 5 can be prevented.

The second solar wheel 62 includes a second solar toothed gear 621 and a second solar pinion 622 fixed to the second solar toothed gear 621. The second solar pinion 622 is rotatably supported by the display arbor 611, and thus the second solar wheel 62 is rotatably disposed coaxially with the first solar wheel 61.

The planetary intermediate wheel 63 is rotatably supported by the display arbor 611, and is coaxial with the first solar wheel 61 and the second solar wheel 62. On an outer circumference of the planetary intermediate wheel 63, teeth that mesh with a pinion 78A of the eighth planetary transmission wheel 78 are formed. Further, a rotary shaft 632 having a pin shape is fixed in a position eccentric with respect to a rotary shaft of the planetary intermediate wheel 63.

The planetary wheel 64 includes a planetary toothed gear 641 and a planetary pinion 642 integrally fixed to the planetary toothed gear 641, and is rotatably supported by the rotary shaft 632 of the planetary intermediate wheel 63.

The planetary toothed gear 641 meshes with the second solar pinion 622, and the planetary pinion 642 meshes with the first solar toothed gear 612.

Operation of Power Reserve Display Mechanism

In such a power reserve display mechanism, an operation when the first mainspring 20 and the second mainspring 30 are wound up and rewound will be described.

When the first ratchet wheel 24 is rotated by the manual windup mechanism 40 and the automatic windup mechanism 50, the first barrel arbor 23 rotates and the first mainspring 20 is wound up. Further, as the first barrel arbor 23 rotates, the first planetary transmission wheel 711, the second planetary transmission wheel 712, the third planetary transmission wheel 713, the fourth planet transmission wheel 714, the fifth planetary transmission wheel 715, and the sixth planetary transmission wheel 716 of the windup display train wheel 71 rotate, and the torque is transmitted to the second solar wheel 62, the planetary wheel 64, and the first solar wheel 61. Here, when the first mainspring 20 is wound up and until the second mainspring 30 is fully wound up by the first mainspring 20, the second barrel 32 of the second barrel complete 31 slowly rotates and is almost in a stop state. Thus, the seventh planetary transmission wheel 77 and the eighth planetary transmission wheel 78 of the rewind display train wheel 76 are in a stop state, and the planetary intermediate wheel 63 that meshes with the pinion 78A of the eighth planetary transmission wheel 78 is also in a stop state. For this reason, the planetary wheel 64 supported by the rotary shaft 632 of the planetary intermediate wheel 63 rotates in the place, i.e., rotates to rotate the first solar wheel 61 and the display arbor 611 in a first direction. When the first solar wheel 61 and the display arbor 611 rotate in the first direction, the winding wheel 66 rotates via the second pinion 614, and the power reserve hand 5 rotates in a counterclockwise direction, i.e., a direction in which a remaining amount of winding up of mainsprings displayed by indicating the graduation of the scale portion 14A increases.

Further, when the first mainspring 20 and the second mainspring 30 are rewound, the first ratchet wheel 24 and the windup display train wheel 71 are stopped, and thus the second solar wheel 62 is also stopped. Then, when the second barrel 32 is rotated by rewinding of the second mainspring 30, the torque is transmitted to the planetary intermediate wheel 63 via the seventh planetary transmission wheel 77 and the eighth planetary transmission wheel 78 of the rewind display train wheel 76. When the planetary intermediate wheel 63 rotates, the second solar pinion 622 that meshes with the planetary toothed gear 641 of the planetary wheel 64 is stopped, and thus the planetary wheel 64 revolves around the second solar pinion 622 while rotating. In this way, the first solar toothed gear 612 that meshes with the planetary wheel 64 rotates in a second direction that is a reverse direction to the direction during the windup operation of the first mainspring 20 and the second mainspring 30. When the first solar toothed gear 612 rotates in the second direction, the display arbor 611 also rotates in the second direction, the rotation is transmitted to the winding wheel 66 via the second pinion 614, and the power reserve hand 5 rotates in a clockwise direction that is a reverse direction to the direction during the windup operation.

Generator

As illustrated in FIG. 4, the generator 80 includes a rotor 81 and coil blocks 82 and 83. The rotor 81 includes a rotor magnet 81A, a rotor pinion 81B, and a rotor inertial disk 81C. The rotor inertial disk 81C reduces a fluctuation in rotation speed of the rotor 81 with respect to a drive torque fluctuation from the second barrel 32. The coil blocks 82 and 83 are constituted by winding a coil on each core.

Therefore, when the rotor 81 rotates due to the torque from the outside, the generator 80 can generate induced power by the coil blocks 82 and 83, and output and supply electrical energy to an IC and the like. Further, a brake can be applied to the rotor 81 by causing the coil to short, and a rotation period of the rotor 81 can be adjusted to be constant by controlling a brake force.

In this way, the watch 1 according to the present exemplary embodiment is configured as an electronically controlled mechanical watch including the generator 80 that generates induced power and outputs electrical energy.

Note that, in the present exemplary embodiment, when the main plate 11 is divided into two regions on the 12 o'clock side and the six o'clock side, the generator 80 is disposed in the region on the six o'clock side, i.e., a region different from the region on the 12 o'clock side in which the first barrel complete 21 and the second barrel complete 31 are disposed.

Display Train Wheel

Next, the display train wheel 90 that drives the hour hand 4A, the minute hand 4B, and the seconds hand 4C by mechanical energy from the first mainspring 20 and the second mainspring 30 will be described.

As illustrated in FIGS. 4, 7, and 8, the display train wheel 90 includes a center wheel and pinion 92, a third wheel and pinion 93, a fourth wheel and pinion 94, a fifth wheel and pinion 95, and a sixth wheel and pinion 96. After being transmitted to the center wheel and pinion 92, the rotation of the second barrel 32 sequentially increases in speed by the third wheel and pinion 93, the fourth wheel and pinion 94, the fifth wheel and pinion 95, and the sixth wheel and pinion 96, and is transmitted to the rotor 81.

As illustrated in FIG. 7, the minute hand 4B is fixed to the center wheel and pinion 92 via the cannon pinion 921.

The fourth wheel and pinion 94 includes the seconds hand shaft 941 to which the seconds hand 4C is fixed, a fourth toothed gear 942 that meshes with the fifth wheel and pinion 95, and a fourth pinion 943 that meshes with the third wheel and pinion 93. In the present exemplary embodiment, the seconds hand shaft 941 of the fourth wheel and pinion 94 is supported by the train wheel bridge 14 and the main plate 11 via the cannon pinion 921. Note that the fourth wheel and pinion 94 is one example of a seconds wheel and pinion according to the present disclosure.

The hour wheel 97 is coupled to the cannon pinion 921 via a minute wheel (not illustrated), and the hour hand 4A is fixed to the hour wheel 97.

A date indicator driving intermediate wheel 97A is attached to the hour wheel 97, and a date indicator driving finger that rotates the date indicator 6 is attached to a date indicator driving wheel 98 rotated by the date indicator driving intermediate wheel 97A.

Further, a date jumper 99 that holds backlash of the date indicator 6 engages with an inner tooth of the date indicator 6. In the present exemplary embodiment, the date jumper 99 is swingably attached by a shaft member 100 attached to the main plate 11.

In the watch 1 described above, an AC output from the generator 80 is boosted and rectified through a rectifier circuit formed of boost rectification, full-wave rectification, half-wave rectification, transistor rectification, and the like, and is charged to a smoothing capacitor, and a rotation control device (not illustrated) that controls a rotation period of the generator 80 is operated by power from the capacitor. Note that the rotation control device is formed of an integrated circuit including an oscillator circuit, a frequency circuit, a rotation detection circuit, a rotation speed comparison circuit, an electromagnetic brake control means, and the like, and a crystal oscillator is used in the oscillator circuit.

Arrangement of Fourth Wheel and Pinion and Eccentric Wheel

As illustrated in FIG. 4, in the present exemplary embodiment, the seconds hand shaft 941 of the fourth wheel and pinion 94 and the eccentric shaft member 532 of the eccentric wheel 53 are disposed in positions that do not overlap each other in the plan view. Furthermore, as described above, the eccentric shaft member 532 and the transmission wheel shaft 551 of the transmission wheel 55 are supported by the main plate 11 and the train wheel bridge 14, as illustrated in FIG. 6. Then, as illustrated in FIG. 7, the seconds hand shaft 941 is supported by the train wheel bridge 14 and the main plate 11 via the cannon pinion 921. In other words, the seconds hand shaft 941, the eccentric shaft member 532, and the transmission wheel shaft 551 of the transmission wheel 55 are supported by the main plate 11 and the train wheel bridge 14. For this reason, a reception member can be reduced as compared to a case in which the seconds hand shaft 941, the eccentric shaft member 532, and the transmission wheel shaft 551 of the transmission wheel 55 are each supported by a different reception member, and thus a thickness of the watch 1 can be reduced.

Advantageous Effects of Exemplary Embodiment

According to the present exemplary embodiment, the following advantageous effects can be produced.

In the watch 1 according to the present exemplary embodiment, the eccentric shaft member 532 and the seconds hand shaft 941 are disposed in positions that do not overlap each other in the plan view. Then, the seconds hand shaft 941, the eccentric shaft member 532, and the transmission wheel shaft 551 are supported by the main plate 11 and the train wheel bridge 14. In this way, a reception member can be reduced as compared to a case in which the seconds hand shaft 941, the eccentric shaft member 532, and the transmission wheel shaft 551 are each supported by a different reception member.

Furthermore, the power reserve hand 5 is disposed in a position that does not overlap the weight 511 in the plan view, and is disposed in a position that overlaps the train wheel bridge 14 in the side view. In this way, even when the weight 511 and the power reserve hand 5 are not disposed side by side in the thickness direction of the watch 1, interference between the weight 511 and the power reserve hand 5 can be prevented.

Therefore, a thickness of the watch 1 can be reduced in the watch 1 configured to allow the power reserve hand 5 to be visually recognizable from the rear side.

In the present exemplary embodiment, the weight 511 and the train wheel bridge 14 are disposed in positions that do not overlap each other in the plan view, and are disposed so as to partially overlap each other in the side view. Thus, a thickness of the watch 1 can be reduced as compared to a case in which the weight 511 and the train wheel bridge 14 are disposed side by side in the thickness direction of the watch 1.

Further, in the present exemplary embodiment, the center wheel bridge 13 is disposed such that a part thereof overlaps the weight 511 in the plan view. Thus, the watch 1 can be reduced in size as compared to a case in which the weight 511 and the central wheel bridge 13 are disposed so as not to overlap each other in the plan view.

In the present exemplary embodiment, the watch 1 includes the first barrel complete 21 and the second barrel complete 31. Thus, a duration when the first mainspring 20 and the second mainspring 30 are fully wound up can be extended.

Furthermore, in the present exemplary embodiment, the first barrel complete 21 and the second barrel complete 31 are disposed in positions that do not overlap each other in the plan view. Thus, a thickness of the watch 1 can be reduced.

In the present exemplary embodiment, when the watch 1 is divided into two regions of the first region including the hour mark 3B indicating six o'clock and the second region including the hour mark 3B indicating 12 o'clock by the line segment connecting the hour marks 3B indicating three o'clock and nine o'clock of the dial 3 in the plan view, the first barrel complete 21 and the second barrel complete 31 are disposed in the second region. Thus, the first barrel complete 21 and the second barrel complete 31 do not interfere with the generator 80 and the like disposed in the first region, and thus a layout of each of the components can be facilitated in the movement 10.

In the present exemplary embodiment, the opening 512A is provided, in the weight body 512, in a position corresponding to the power reserve hand 5.

Thus, the power reserve hand 5 can be less visually unrecognizable due to a position of the oscillating weight 51.

In the present exemplary embodiment, the watch 1 is configured as an electronically controlled mechanical watch including the display train wheel 90 and the generator 80 driven by the display train wheel 90 to generate induced power and output electrical energy.

In this way, the electronically controlled mechanical watch that can highly precisely and smoothly drive the hour hand 4A, the minute hand 4B, and the seconds hand 4C by operating a rotation control circuit with the power generated by the generator 80 and adjusting a rotation speed of the generator 80, i.e., a rotation speed of the display train wheel 90 to a high degree of precision can be provided.

Modification Example

Note that the present disclosure is not limited to each of the exemplary embodiments described above, and variations, modifications, and the like within the scope in which the object of the present disclosure can be achieved are included in the present disclosure.

In the exemplary embodiment described above, the watch 1 is configured as an electronically controlled mechanical watch including the generator 80 and the display train wheel 90, which is not limited thereto. For example, the watch may be configured as a mechanical watch including a general speed governing mechanism, such as an escape wheel and a pallet fork.

In the exemplary embodiment described above, the watch 1 is configured to include two mainsprings of the first mainspring 20 and the second mainspring 30, but is not limited thereto, and may be configured to include only one mainspring.

SUMMARY OF PRESENT DISCLOSURE

A watch according to the present disclosure includes a barrel complete including a barrel arbor and a mainspring, a ratchet wheel configured to rotate integrally with the barrel arbor, and wind up the mainspring, a power reserve hand configured to be visually recognizable from a watch rear side, and indicate a remaining amount of the mainspring wound up, an oscillating weight including a weight and a weight body configured to support the weight, a transmission wheel configured to rotate the ratchet wheel, a pawl lever configured to engage with the transmission wheel, an eccentric wheel that includes an eccentric shaft member to which the pawl lever is attached and an eccentric toothed gear configured to rotate in conjunction with the oscillating weight, and is configured to cause the pawl lever to advance and retreat in directions toward and away from the transmission wheel, a train wheel bridge provided between the pawl lever and the oscillating weight, and configured to support the transmission wheel, and a seconds wheel and pinion including a seconds hand shaft to which a seconds hand is attached, where the eccentric shaft member and the seconds hand shaft are disposed in positions that do not overlap each other in plan view as viewed from a direction along the seconds hand shaft, and are supported by the train wheel bridge, and the power reserve hand is disposed in a position that does not overlap the weight in the plan view, and is disposed in a position that overlaps the train wheel bridge in side view orthogonal to the seconds hand shaft.

In this way, a reception member can be reduced as compared to a case in which the eccentric wheel, the seconds wheel and pinion, and the transmission wheel are each supported by a different reception member. Furthermore, even when the weight and the power reserve hand are not disposed side by side in a thickness direction of the watch, interference between the weight and the power reserve hand can be prevented. Therefore, a thickness of the watch can be reduced in the watch configured to allow the power reserve hand to be visually recognizable from the rear side.

The watch according to the present disclosure may include a main plate, a winding wheel to which the power reserve hand is attached, and a central wheel bridge disposed between the main plate and the train wheel bridge in the side view, and configured to support the winding wheel, where the train wheel bridge may be disposed in a position that does not overlap the weight in the plan view, and the central wheel bridge may be disposed in a position that at least partially overlaps the weight.

In this way, a thickness of the watch can be reduced as compared to a case in which the weight and the train wheel bridge are disposed side by side in the thickness direction of the watch. Furthermore, the watch can be reduced in size as compared to a case in which the weight and the central wheel bridge are disposed so as not to overlap each other in the plan view.

The watch according to the present disclosure may include a first barrel complete and a second barrel complete that constitute the barrel complete, where the first barrel complete and the second barrel complete may be disposed in positions that do not overlap each other in the plan view.

In this way, a duration when the first mainspring and the second mainspring are fully wound up can be extended. Furthermore, the first barrel complete and the second barrel complete are disposed in the positions that do not overlap each other in the plan view, and thus a thickness of the watch can be reduced.

The watch according to the present disclosure may include a dial, where, when the watch is divided, by a line segment connecting graduations indicating three o'clock and nine o'clock of the dial, into two regions of a first region including the graduation indicating six o'clock and a second region including the graduation indicating 12 o'clock in the plan view, the first barrel complete and the second barrel complete may be disposed in the first region or the second region.

In this way, for example, when a speed governing mechanism such as a generator is disposed in the first region, the first and second barrel completes and the speed governing mechanism do not interfere with each other, and thus a layout of each of the components can be facilitated.

In the watch according to the present disclosure, an opening may be provided, in the weight body, in a position corresponding to the power reserve hand.

In this way, the power reserve hand 5 can be less visually unrecognizable due to a position of the oscillating weight.

The watch according to the present disclosure may include a display train wheel that is rotated by the barrel complete and includes the seconds wheel and pinion, and a generator driven by the display train wheel to generate induced power and output electrical energy, where the watch may be configured as an electrically controlled mechanical watch.

In this way, the electronically controlled mechanical watch that can highly precisely and smoothly drive a hand such as a seconds hand by operating a rotation control circuit with the power generated by the generator and adjusting a rotation speed of the generator, i.e., a rotation speed of the display train wheel to a high degree of precision can be provided.

The watch according to the present disclosure may include a display train wheel that is rotated by the barrel complete and includes the seconds wheel and pinion, and an escape wheel and pinion configured to rotate in conjunction with the display train wheel, where the watch may be configured as a mechanical watch.

What is claimed is:

1. A watch comprising:

a barrel complete including a barrel arbor and a mainspring;

a ratchet wheel configured to rotate integrally with the barrel arbor, and wind up the mainspring;

a power reserve hand configured to be visually recognizable from a watch rear side, and indicate a remaining amount of the mainspring wound up;

an oscillating weight including a weight and a weight body configured to support the weight;

a transmission wheel configured to rotate the ratchet wheel;

a pawl lever configured to engage with the transmission wheel;

an eccentric wheel that includes an eccentric shaft member to which the pawl lever is attached and an eccentric toothed gear configured to rotate in conjunction with the oscillating weight, and is configured to cause the pawl lever to advance and retreat in directions toward and away from the transmission wheel;

a train wheel bridge provided between the pawl lever and the oscillating weight, and configured to support the transmission wheel; and a seconds wheel and pinion including a seconds hand shaft to which a seconds hand is attached, wherein the eccentric shaft member and the seconds hand shaft are disposed in positions that do not overlap each other in plan view as viewed from a direction along the seconds hand shaft, and are supported by the train wheel bridge, and the power reserve hand is disposed in a position that does not overlap the weight in the plan view, and is disposed in a position that overlaps the train wheel bridge in side view orthogonal to the seconds hand shaft.

2. The watch according to claim 1 comprising:

a main plate;

a winding wheel to which the power reserve hand is attached; and a central wheel bridge disposed between the main plate and the train wheel bridge in the side view, and configured to support the winding wheel, wherein the train wheel bridge is disposed in a position that does not overlap the weight in the plan view, and the central wheel bridge is disposed in a position that at least partially overlaps the weight.

3. The watch according to claim 1 comprising a first barrel complete and a second barrel complete that constitute the barrel complete, wherein the first barrel complete and the second barrel complete are disposed in positions that do not overlap each other in the plan view.

4. The watch according to claim 3 comprising a dial, wherein, when the watch is divided, by a line segment connecting graduations indicating three o'clock and nine o'clock of the dial, into two regions of a first region including the graduation indicating six o'clock and a second region including the graduation indicating 12 o'clock in the plan view, the first barrel complete and the second barrel complete are disposed in the first region or the second region.

5. The watch according to claim 1, wherein an opening is formed, in the weight body, in a position corresponding to the power reserve hand.

6. The watch according to claim 1 comprising:

a display train wheel that is rotated by the barrel complete and includes the seconds wheel and pinion; and a generator driven by the display train wheel to generate induced power and output electrical energy, the watch being configured as an electrically controlled mechanical watch.

7. The watch according to claim 1 comprising:

a display train wheel that is rotated by the barrel complete and includes the seconds wheel and pinion; and an escape wheel and pinion configured to rotate in conjunction with the display train wheel, the watch being configured as a mechanical watch.

* * * * *